US007945441B2

(12) United States Patent
Thompson et al.

(10) Patent No.: US 7,945,441 B2
(45) Date of Patent: May 17, 2011

(54) QUANTIZED FEATURE INDEX TRAJECTORY

(75) Inventors: R. Donald Thompson, Sammamish, WA (US); Kunal Mukerjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 11/835,389

(22) Filed: Aug. 7, 2007

(65) Prior Publication Data

US 2009/0043575 A1    Feb. 12, 2009

(51) Int. Cl.
*G10L 19/00* (2006.01)
(52) U.S. Cl. .......................... 704/222; 704/230
(58) Field of Classification Search .................. 704/222, 704/230
See application file for complete search history.

(56) References Cited

U.S. PATENT DOCUMENTS

| | | | | |
|---|---|---|---|---|
| 5,258,924 | A |  | 11/1993 | Call et al. ........................ 364/516 |
| 5,675,701 | A | * | 10/1997 | Kleijn et al. ................... 704/222 |
| 5,819,224 | A | * | 10/1998 | Xydeas ........................... 704/222 |
| 5,857,196 | A |  | 1/1999 | Angle et al. .................... 707/102 |
| 6,006,188 | A |  | 12/1999 | Bogdashevsky et al. ..... 704/270 |
| 6,009,387 | A |  | 12/1999 | Ramaswamy et al. ........ 704/222 |
| 6,018,741 | A |  | 1/2000 | Howland et al. .............. 707/102 |
| 6,223,155 | B1 |  | 4/2001 | Bayya ............................ 704/243 |
| 6,292,778 | B1 |  | 9/2001 | Sukkar .......................... 704/256 |
| 6,347,297 | B1 |  | 2/2002 | Asghar et al. ................. 704/243 |
| 6,418,412 | B1 |  | 7/2002 | Asghar et al. ................. 704/256 |
| 6,631,346 | B1 |  | 10/2003 | Karaorman et al. ............. 704/9 |
| 6,778,970 | B2 |  | 8/2004 | Au .................................. 706/55 |
| 7,203,635 | B2 |  | 4/2007 | Oliver et al. .................... 703/22 |
| 2002/0133348 | A1 |  | 9/2002 | Pearson et al. ................ 704/258 |
| 2002/0164152 | A1 | * | 11/2002 | Kato et al. ....................... 386/95 |
| 2007/0112765 | A1 |  | 5/2007 | Vishik ............................... 707/5 |
| 2007/0131094 | A1 |  | 6/2007 | Kemp ............................. 84/609 |
| 2009/0112905 | A1 |  | 4/2009 | Mukerjee ........................... 1/1 |

OTHER PUBLICATIONS

Youssef et al.; Disturbance Classification Utilizing Dynamic Time Warping Classifier; IEEE Transactions on Power Delivery, vol. 19, No. 1, Jan. 2004. pp. 272-278.*
Moënne-Loccoz et al.; "Local Feature Trajectories for Efficient Event-Based Indexing of Video Sequences"; 10 pgs.
Lee et al.; "A New Method to Achieve Fast Acoustic Matching for Speech Recogniztion"; 4 pgs.
Office Action mailed Mar. 11, 2010, in U.S. Appl. No. 11/923,430.
Office Action mailed Jul. 27, 2010, in U.S. Appl. No. 11/923,430.

* cited by examiner

*Primary Examiner* — Abul Azad
(74) *Attorney, Agent, or Firm* — Merchant & Gould

(57) ABSTRACT

Indexing methods are described that may be used by databases, search engines, query and retrieval systems, context sensitive data mining, context mapping, language identification, image recognition, and robotic systems. Raw baseline features from an input signal are aggregated, abstracted and indexed for later retrieval or manipulation. The feature index is the quantization number for the underlying features that are represented by an abstraction. Trajectories are used to signify how the features evolve over time. Features indexes are linked in an ordered sequence indicative of time quanta, where the sequence represents the underlying input signal. An example indexing system based on the described processes is an inverted index that creates a mapping from features or atoms to the underlying documents, files, or data. A highly optimized set of operations can be used to manipulate the quantized feature indexes, where the operations can be fine tuned independent from the base feature set.

20 Claims, 9 Drawing Sheets

QUANTIZED FEATURE INDEX TRAJECTORY

FIELD OF THE INVENTION

The present disclosure is generally related to indexing methods that may be used by databases, search engines, query and retrieval systems, context sensitive data mining, context mapping, language identification, and robotic systems. Raw baseline features are aggregated, abstracted and indexed for later retrieval or manipulation. The feature index is the quantization number for the underlying features that are represented by the abstraction. Trajectories are used to signify how the features evolve over time.

BACKGROUND OF THE DISCLOSURE

Speech recognition and computer vision do not couple well with higher level processing such as databases, query/retrieval applications, or archiving and indexing applications. In part, these difficulties result because there is no intermediate layer to represent time-varying features of sound and vision in a domain-independent way that can be easily processed using conventional algorithmic methods. For example, a conventional speech processing algorithm may be arranged to map each sound utterance into one or more text characters that can be used as baseline features.

A conventional algorithmic method then can evaluate these baseline features to form words and phrases that can then be indexed by a database. However, each time the base level features change the entire database has to be re-indexed. In some instances, the algorithms themselves may need to be changed when the baseline features change. The scalability of such systems can also be difficult because each algorithmic module may need to be isolated from all the others. It may also become difficult to optimize higher level algorithms or to reuse standard algorithms because of the close coupling.

DETAILED DESCRIPTION OF THE PREFERRED EMBODIMENT

Figure 1:
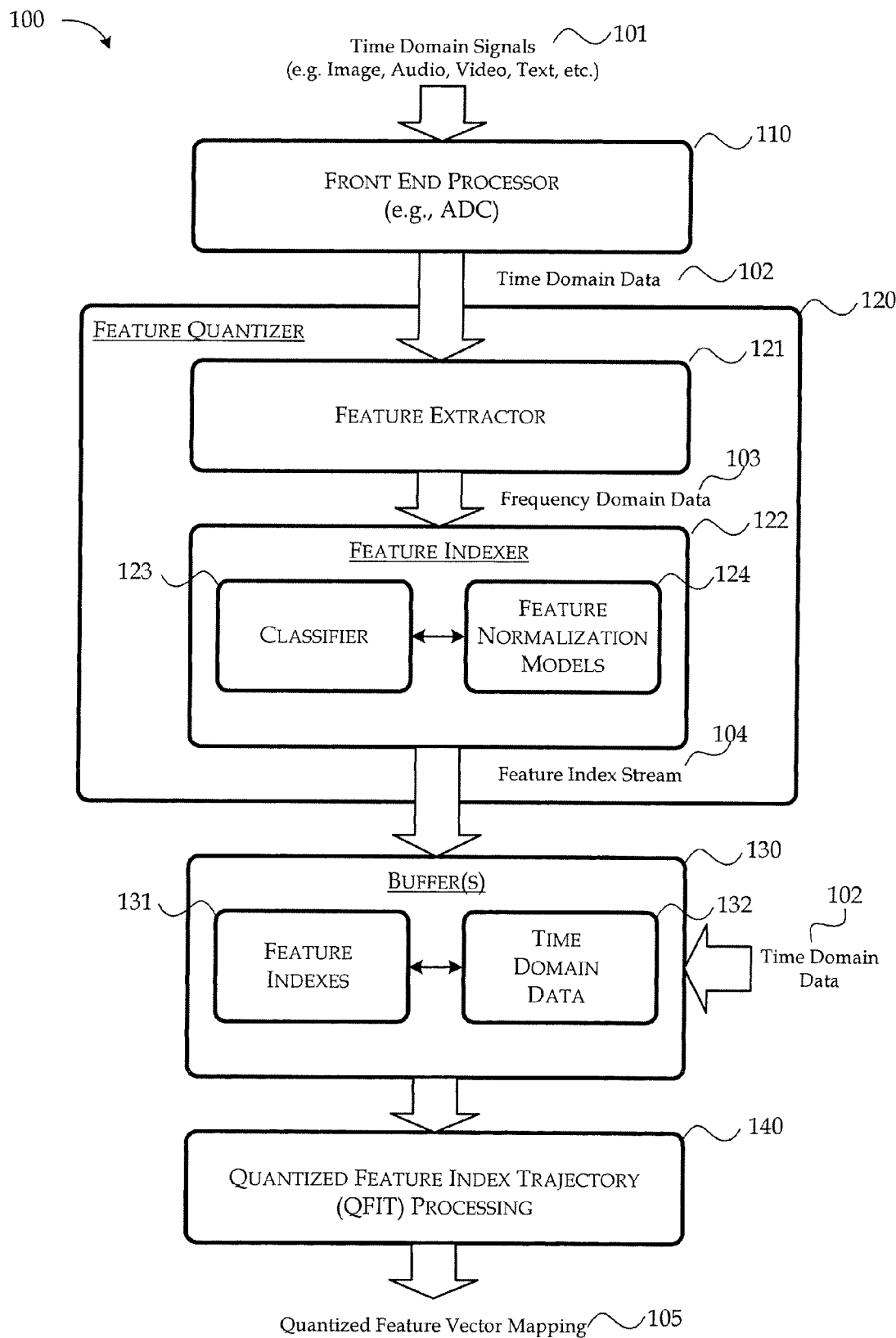
FIG. 1 is a block diagram illustrating an example system and/or apparatus that is arranged in accordance with some features of the present disclosure.

Embodiments of the present invention will be described in detail with reference to the drawings, where like reference numerals represent like parts and assemblies throughout the several views. Reference to various embodiments does not limit the scope of the invention, which is limited only by the scope of the claims attached hereto. The examples set forth in this specification are not intended to be limiting and merely set forth some of the many possible embodiments for the claimed invention.

General Discussion

The present disclosure is generally related to indexing methods that may be used by databases, search engines, query and retrieval systems, context sensitive data mining, context mapping, language identification, image recognition, and robotic systems. Raw baseline features from an input signal are aggregated, abstracted and indexed for later retrieval or manipulation. The feature index is the quantization number for the underlying features that are represented by an abstraction. Trajectories are used to signify how the features evolve over time. A highly optimized set of operations can be used to manipulate the quantized feature indexes, where the operations can be fine tuned independent from the base feature set.

The described indexing scheme can represent feature trajectories of different types such as scalar quantities or vector quantities. Example features are identified from the input signal, which can be a time domain varying signal. The input signal can be any variety of input signal such as, for example, audio signals, video signals, digital images, text sequences, as well as other varieties of input signals. For analog input signals that continuously vary over time, e.g. audio and video signals, the input signal can be broken into discrete digital values that form an input data stream. Each discrete digital value in the stream corresponds to a portion of the input signal at a particular point in time. For example, an audio signal can be converted (e.g., via an analog-to-digital converter) into 16-bit values that are sampled at a rate of 8 kbps. In this example, the audio signal can either be converted into digital values or encoded as digital values in some other numerical representation. A sequence of the digital values forms a digital data stream, where each successive digital value occurs at a later point in time relative to the input signal.

In some instances, the input signals are already in the digital domain and conversion is not required. For example, a digital picture is comprised of an array of pixel values arranged in a series of rows and columns. Each pixel from the image may include multiple color planes (e.g., red, green and blue), as well as other characterizing features such as intensity, saturation, tone, etc. Digital values associated with each pixel can be pipelined into the digital data stream. In one example, every pixel is pipelined in succession along a row in the digital image. In another example, a subset of the pixels are pipelined in succession (e.g., every other pixel, every fifth pixel, every other row, etc.). In some examples, a sample block grouping of pixels can be pipelined in succession (e.g., a 10×10 grouping of pixels from a larger image).

Once in the digital domain, features are identified from each set of digital values. In some examples, the features correspond to phonemes from human speech. In other examples, the features correspond to representative sampling of a digital image or video stream. In general, any data stream that includes a multiplicity of values occurring in succession to one another over time can be used to represent the input signal for identification of features. The features themselves can be representative of indexes to a feature mapping. For example, human speech can be represented by one of 43 speech phonetics, where each digital value in the data steam represents an index to one of the speech phonetics.

Each feature can be linked to other features that occur in succession to one another in the digital data stream to form a sequence of indexes. Each feature in the sequence represents a time quantized feature (e.g., speech phonetics). The sequence of indexed features forms a trajectory over time. The input signal (which can be time varying), and the digital representation of the input signal, can be indexed based on the sequence of features that are identified in the trajectory. The term QFIT thus represents a Quantized Feature Index Trajectory, which is a series of features indexes that are linked to one another in an order that is indicative of time quanta, where the sequence of indexes are representative of the underlying input signal. An indexing system that is based on the QFIT processes described herein can also be referred to as an inverted index, where the resulting indexes create a mapping from features or atoms to the underlying documents or files.

Illustrative System and/or Apparatus

FIG. 1 is a block diagram illustrating an example system and/or apparatus (100) that is arranged in accordance with some features of the present disclosure. Apparatus 100 is illustrated as processing time domain signals such as images, audio, video, or text, and generating quantized feature vectors that can be used as an index to the time domain signals. Apparatus 100 includes an optional front end processor block (110), a feature quantizer block (120), one or more buffer blocks (130), and a QFIT processing block (140). The various blocks described below are merely one example, and the functions provided by the blocks can be combined into fewer blocks, or separated into additional blocks as may be desired in a specific implementation.

Front end processor block 110 is arranged to generate time domain data 102 in response to time domain signals or input signals 101. In some examples, front end processor block 110 includes an analog-to-digital converter (ADC) that generates a stream of digital values (e.g., 16-bit values) by sampling a time varying input signal (e.g., audio, video, etc.) at a specified sampling rate (e.g., 4 kHz, 8 kHz, 16 kHz, 20 kHz, 22 kHz, 40 kHz, 44 kHz, etc.). In some other examples, front end processor block 110 may also include a pre-amplifier circuit that increases the signal levels such as for audio or video signals, a filter circuit to remove unwanted noise, a tone control circuit to balance the frequency response of audio signals, a color balancing circuit to adjust color intensity, saturation, etc., as well as other circuits such as a digital signal processor (DSP) that can otherwise perform similar functions. Front end processor block 110 can generally be described as an adapter that is arranged to condition input signals from an analog time domain into a digital time domain so that the input signal is translated into a stream of digital values or time domain data 102. The stream of digital values may be either fixed point number or floating point numbers as may be desired. In some instances where the input signal is inherently provided in a digital time domain (e.g., text input), the front end processor block 110 may be eliminated as unnecessary.

Feature quantizer block 120 is configured in communication with front end processor block 110, and arranged to generate a stream of feature indexes (104) in response to the digital time domain data (102). Each quantized feature is a numerical value that identifies a baseline feature associated with the input signal. Each successive numerical value from feature quantizer block 120 corresponds to another baseline feature that is identified with the input signal at a later point in time. In general, feature quantizer block 120 is arranged to map from a digital data space into a feature dependent space.

In some examples, feature quantizer block 120 can be implemented as hardware, software, or a combination of hardware and software. Example hardware systems can include a Fast Fourier Transform (FFT) signal processor such as may be found in a digital signal processor (DSP) or an application specific integrated circuit (ASIC), for example. The feature quantizer block 120 can be functionally partitioned into two blocks including a feature extractor (121), and a feature indexer (122), or the functions can be combined together into a single block. Feature extractor 121 is arranged to transform time domain data 102 into frequency domain data 103 by applying an FFT process. The capture window for the FFT process can be tuned for specific applications such as for human speech so that an appropriate number of data points from the time domain data steam are grouped together for FFT processing. Once data is in the frequency domain, feature indexer 122 can process the frequency spectrum (e.g., a series of frequency values with their specified magnitudes) to identify specific features such as human speech phonetics, for example. For this purpose, feature indexer 122 includes a classifier (123) that is arranged to compare the frequency domain data (103) to a normalized set of feature models (124) to identify an appropriate feature index for each portion of the frequency domain data. For this example, the feature index stream (104) corresponds to a series of numerical values that each represents a human speech phonetic at a particular point in time relative to the time domain data (102). Example feature indexes will be described later.

Feature index steam 104 can be stored in one or more buffers (130) such as an associative memory. One portion of the buffers (131) can be dedicated to storing the stream of feature indexes (104), while another portion (132) of the buffers can be dedicated to storing the time domain data (102). The two portions (131 and 132) are associated with one another so that sequences of indexes can be associated with the corresponding time domain data (102). In some examples, the buffers (130) are simply program memory that is used by a processor (e.g., micro-processor, micro-controller, DSP, ASIC, etc.) for general computational operations. In some other examples, the buffers (130) correspond to one or more internal memory banks in the processor. In still other examples, the buffers (130) are high-speed caching memories that are useful for pipelined operations. In general, any appropriate buffer mechanism can be used for storing the sequence of indexes that are associated with time domain data.

QFIT processing block 140 is arranged to access the buffers to process the sequence of feature indexes that are associated with a particular time domain data set to generate a set of feature vector mappings (105). Each feature vector mapping (105) includes a link or pointer to a feature index from a sequence of feature indexes that occurred in a feature index stream. Feature indexes are linked to one another in the sequence so that the feature vector actually identifies a starting location or vector into the sequence. Once the feature vectors are mapped via feature indexes, the time domain data is associated with the generated feature vectors, and the indexes are updated for searching and retrieval operations. The QFIT processing methods will be further explained with reference to FIGS. 2-8 as will be described hereafter.

Feature Vector Generation

Figure 2:
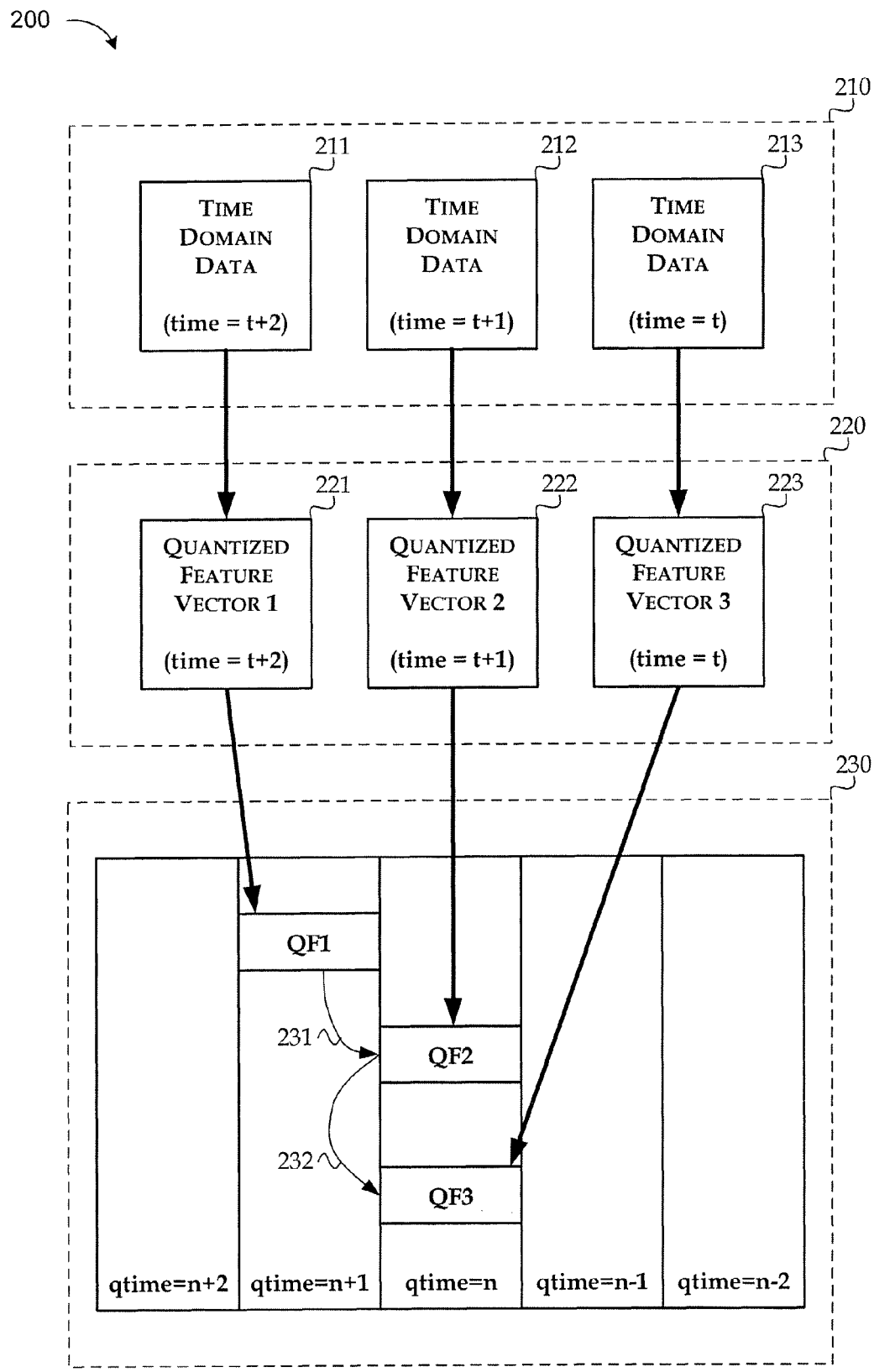
FIG. 2 is a graphical diagram illustrating the generation of feature vectors that map various features into a quantized time domain in accordance with at least some features of the present disclosure.

FIG. 2 is a graphical diagram illustrating the generation of feature vectors that map various features into a quantized time domain in accordance with at least some features of the present disclosure.

QFIT is a mapping from a sequence of feature vectors, into an index space that is time quantized. Each entry in a QFIT table has a "previous pointer" or link that points back to the previous feature's index. Thus, by following the previous pointers one could unravel the entire feature trail or sequence. Each feature vector maps to a feature index, where the mapping could be one-to-one or many-to-one depending on the implementation.

In set theoretic terms, QFIT processing generally induces a mapping from a set of reals (i.e. feature vectors) of dimensionality n, where n is the number of features in each vector, to a set of non-negative integers, which correspond to the feature indices. Over time, this becomes a sequence or trail of function applications. QFIT can therefore be described by the following set-theoretic notation $$f(t):R^n(t) \rightarrow Z^+(t)$$

As illustrated in FIG. 2, time domain data (210) is divided into frames (211, 212, and 213) that are each time indexed (t, t+1, t+2, etc.). The time domain data (210) is thus "framed" into a sequence of time windows, where each time window contains a number of samples from the time domain data. For example, an input signal for audio can be divided into time windows of 256 samples per frame, where each sample corresponds to a 16-bit signed PCM values associated with the input signal. Feature vectors (220) are computed for each frame (221, 222, and 223) and associated with the same corresponding time indexes (t, t+1, t+2, etc.) as the corresponding frame (211, 212 and 213). Each feature vector can be a tset of mel frequency cepstral coefficients, or smoothed group delay spectrum (SGDS) coefficients, or be the result of further processing on these feature vectors (e.g. ending up in phonemes).

A mapping is defined from each feature vector (221, 222 and 223) to the QFIT index, in onto fashion (i.e. each feature vector maps onto a single feature index of the QFIT representation). QFIT processing thus represents a feature to index translation. The mappings can be provided in any appropriate method, including but not limited to mapping to phonemes and mapping to scalar quantized SGDS feature vectors.

Another aspect of QFIT processing that is illustrated in FIG. 2, is that the time quantization of the QFIT table is independent of the time quantization of the feature vectors. More specifically, there need not be a one-to-one correspondence between the frame index time and the quanta time in QFIT space. For example, time domain data for the frame at time=t is mapped into the QFIT space time or quantum time of time=n. For this example, both feature vectors 222 and 223 are from time indexes time=t and time=t+1 are indexed into QFIT quantum n. FIG. 2 also shows that the feature vector 221, which is indexed at time=t+2, is indexed into the next QFIT quantum (n+1). As shown and illustrated, the time domain indexes are decoupled from the QFIT quantum. This decoupling permits tuning of the QFIT quantization for best grouping/retrieval by higher level algorithms, as well as preventing the indexes from growing too rapidly.

Figure 3:
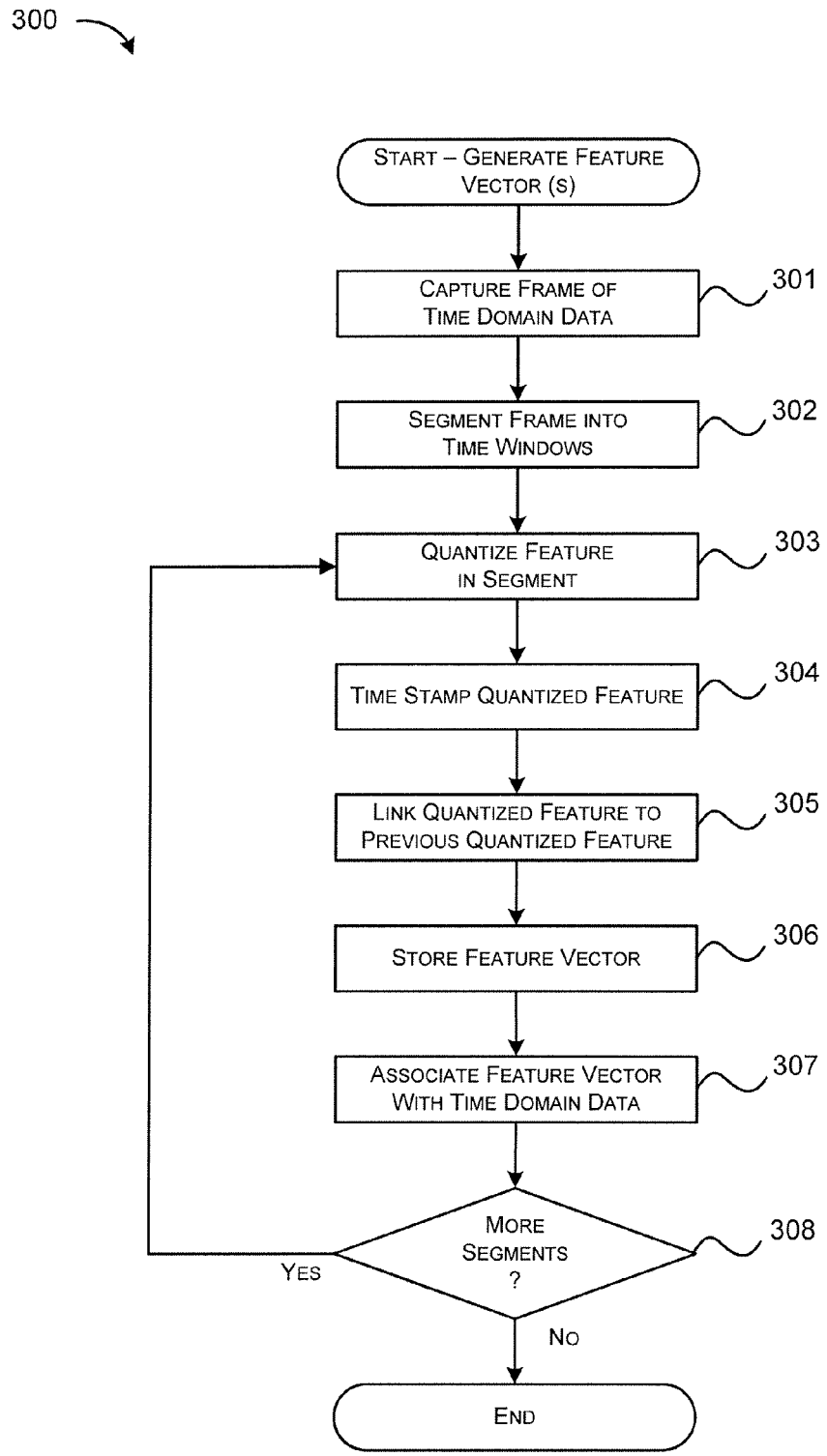
FIG. 3 is a flow diagram illustrating the operational flow for generating feature vectors in accordance with at least some aspects of the present disclosure.

FIG. 3 is a flow diagram illustrating the operational flow (300) for generating feature vectors in accordance with at least some aspects of the present disclosure. Processing begins at block 301, where a frame of time domain data is captured. At block 302, the captured frame is segmented into time windows. The time windows can be either be overlapped with respect to adjacent windows, or non-overlapped.

A processing loop for processing each segment or each time window for the time domain data is illustrated as blocks 303-308. At block 303, a selected segment of the captured frame is quantized into features as previously discussed above. At block 304, the quantized feature is time stamped with a time index relative to the time domain data. Continuing to block 305, a quantized feature is linked to a previous quantized feature to create a feature trail from preceding features. At block 306, the feature vector is stored, including the quantized feature for the segment of the frame, the time stamp, and the link to the prior feature. The feature vector is then associated with the time domain data at block 307 such that the feature vector operates as an index into the time domain data. When additional segments or time windows need to be processed, processing flows from decision block 308 to blocks 303. Otherwise, processing is terminated as all segments of the capture frame for the time domain data has been processed.

The above described feature vector generation methods can be applied to time domain data that corresponds to human speech. For this example, the time domain data can be generated as digital data stream from the output of an analog-to-digital converter (ADC) that processes an audio input signal (e.g., from an audio input stream, from a previously stored audio input stream, etc.).

The time domain data can then be quantized into features that correspond to phonemes, where a large set of phonemes can be used to describe all forms of human speech. There is also a limited set of phonemes that occur in English and in most western languages that is sometimes referred to as the "arpabet." For purposes of building practical speech recognition systems, some of the more esoteric phonemes can be eliminated without detracting from the ability to recognize speech from a combination of the remaining phonemes. The set of phonemes used for characterizing speech can thus typically be reduced down to a set of 40-50 phonemes.

A specific example set (P) of acoustic phonemes, which can be expressed as: P={aa, ae, ah, ao, aw, ax, ay, b, ch, d, dh, dx, eh, er, ey, f, g, hh, ih, ix, iy, jh, k, l, m, n, ng, ow, oy, p, r, s, sh, t, th, uh, uw, v, w, y, z, zh, sil}, which consists of 42 phonemes plus "sil", which stands for inter-phone silence. Time domain data for speech can then be quantized as a sequence of phonetic symbols from the set P. A phonetic to index mapping can thus be used to characterize the speech as a 1:1 mapping that uses 43 indexes, where the indexes to phonemes (or feature indexes) can from a set of numerical indexes (e.g., numbered 0 through 42) or from a symbolical name that is associated with the identified phoneme. The time domain data for speech can thus be segmented into time windows where each segment is evaluated to identify one of the phonetics from the set P, to generate a set of feature indexes that map to different phonetics.

In a different, slightly more complex mapping, the feature vectors can be a 12-coefficient SGDS vectors. Each of the 12 coefficients can be bark-scale warped and scalar quantized into 3-bit numbers that are concatenated together to form a 36 bit quantity (e.g., 12 coefficients×3 bit/coefficient=36 bits). A mapping can then be defined from the 12 coefficient SGDS vectors as a mapping from 36 bit quantities into feature vectors. The feature vector mapping can be accomplished by first extracting the three bit planes, concatenating all the bits from each of those (MSB to LSB) planes into a 12 bit numbers, and using these numbers to look up the QFIT index in one-to-one fashion—in this case there are three separate QFIT tables, each of size $2^{12}$. The following pseudo code demonstrates this operation.

```
Index Compute_QFIT_Index_For_Bitplane_b (SGDS_vector
vector, BitPlane b)
{
    Index index = 0;
    for (i = 0; i < vector.dimension; i++)
        index |= ((((int)vector[i] >> b) & 0x1) << i);
    return index;
}
```

Multi-Resolution Mappings

Figure 4:
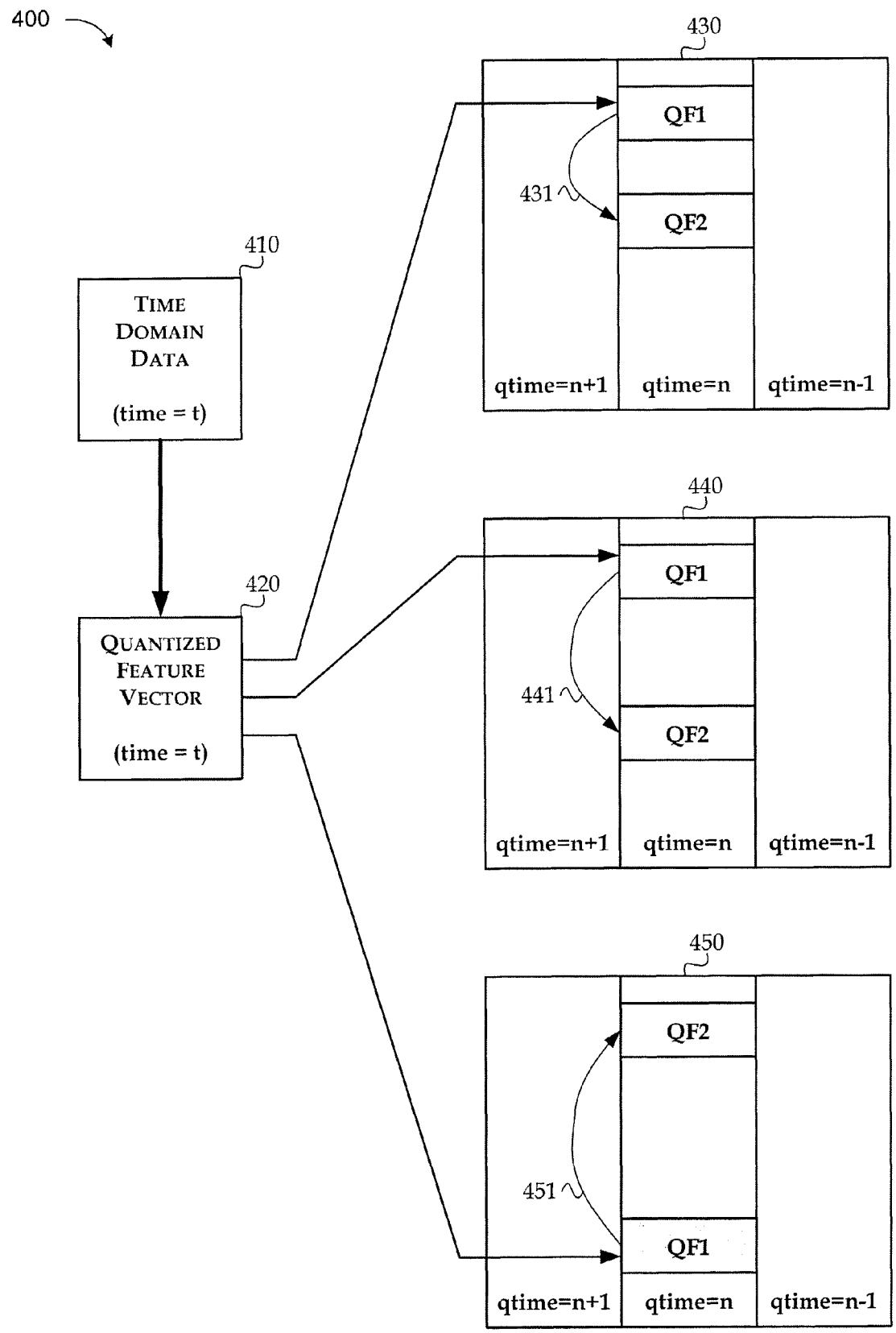
FIG. 4 is a graphical diagram illustrating multi-resolution mapping of features vectors into a quantized time domain in accordance with at least some features of the present disclosure.

FIG. 4 is a graphical diagram (400) illustrating multi-resolution mapping of features vectors into a quantized time domain in accordance with at least some features of the present disclosure. As illustrated in diagram 400, time domain data (410) from time=t is captured and is mapped to a quantized feature vector (420). Quantized feature vector 420 is mapped into a multi-resolution space, where multiple indexes to features are linked to the feature vector 420. The multi-resolution space mapping can result in different feature trajectories and different resulting indexes.

For diagram 400, multi-resolution mappings are made between the quantized feature vector (420) and three QFIT feature tables (430, 440 and 450). Each QFIT feature table can represent a different set of feature trajectories based on different resolution levels. For example, QFIT table 430 can represent a fine resolution, while table 440 can represent a medium resolution and table 450 can represent a coarse resolution. In QFIT feature table 430, a first query feature (QF1) is linked (431) to a second query feature (QF2) in the same time quantum (qtime=n) within a fine resolution proximity. For QFIT feature table 440, the first query feature (QF1) is linked (441) to the second query feature (QF2) in the same time quantum (qtime=n) within a medium resolution proximity. In feature table 450, the first query feature (QF1) is linked (451) to the second query feature (QF2) in the same time quantum (qtime=n) within a coarse resolution proximity, and in an opposite direction.

Multi-resolution mappings can be applied in the case of mapping SGDS feature vectors to three QFIT tables. The QFIT tables correspond to the most significant through the least significant bit plane of the scalar quantized SGDS feature vectors.

In general, the multi-resolution mappings from the feature space of dimensionality n (n=12 in the SGDS example), to the QFIT space comprising m resolution tables can be expressed in the following set-theoretic notation $$f(t):R^n(t) \to Z^{+m}(t)$$

The significance of varying levels of resolution is to permit greater fault tolerance in practical systems. For example, higher level computational processes can be arranged to specify a resolution criteria in the retrieval policy of a query lookup. This may be especially useful in cases where there is low confidence in the highest resolution feature index. Moreover, the higher level processes can also be arranged to evaluate historical data to build up an intuition for confidence and resolution based on clustering and splitting methods.

In one example, a global cluster is used as a common centroid to a set of training data. Each cluster can be refined by successively splitting it into two clusters, until a requisite number of clusters are found. If the coarse level (i.e. larger) clusters are indexed, then in effect there is a hierarchy of clusters, where the fine level clusters are descendants of the coarse level clusters. When there is uncertainty in classifying new data into the fine level clusters, processes can be arranged to automatically "back off" to coarser level clusters until the uncertainty is minimized.

The mappings from any given feature vector to a QFIT table at each level of resolution can be a nearest neighbor to a cluster centroid operation, which can be optimized into simple table lookups. Each QFIT cell in the QFIT table can be linked to other QFIT cells as illustrated. In one example structure, the QFIT cells each include a time domain data identifier (e.g., an association with the time domain data that can be retrieved after a query), a time quantum identifier (e.g., time stamp in the quantum time domain), and a link to a previous QFIT cell from a feature trail.

In the case of speech, each QFIT cell can be represented by a list of tuples: {utterance id, time quantum id, previous Index}, where the utterance id is the index to the time domain data. For convenience and speed of update and lookup operations, the lists of tuples can be maintained as a sorted list. Using set-theoretic notation, we say that each QFIT cell, C, contains sorted tuples for which the following holds:

$$C=\{e_i,e_j|i<j \to \text{utteranceId}(e_i)<\text{utteranceid}(e_j)\text{`quantumId}(e_i)<\text{quantumId}(e_j)\}$$

Now that the content of each QFIT cell (C) is defined, it becomes straightforward to define how the QFIT index table is updated for each incoming feature vector. First the QFIT index is computed for each feature vector, and then a new tuple (e.g., {utterance id, time quantum id, previous index}) is inserted into the appropriate cell in the QFIT table. Each QFIT index can either be a number of the phonetic from the set P as previously discussed or some other quantized feature index such as compute the index for bitplane b when an SGDS feature representation is used. Since the quantized feature can be represented as a linked list, inserting into the QFIT table can be accomplished by means of an insertion sort over linked lists in one possible implementation.

QFIT Feature Trails

Figure 5:
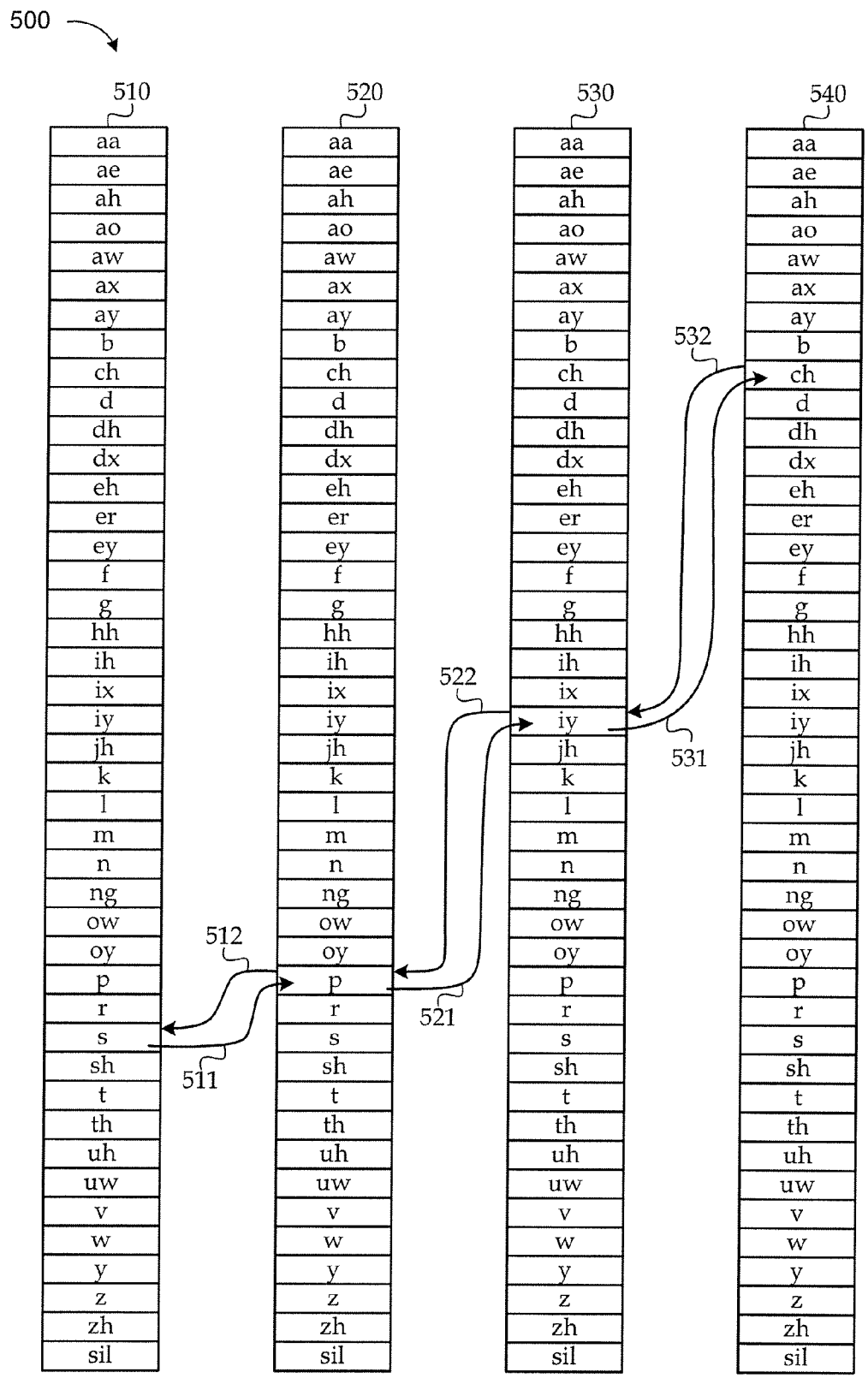
FIG. 5 and FIG. 6 are graphical diagrams illustrating the relationship between example features and pointers that link the features together in accordance with at least some aspects of the present disclosure.
Figure 6:
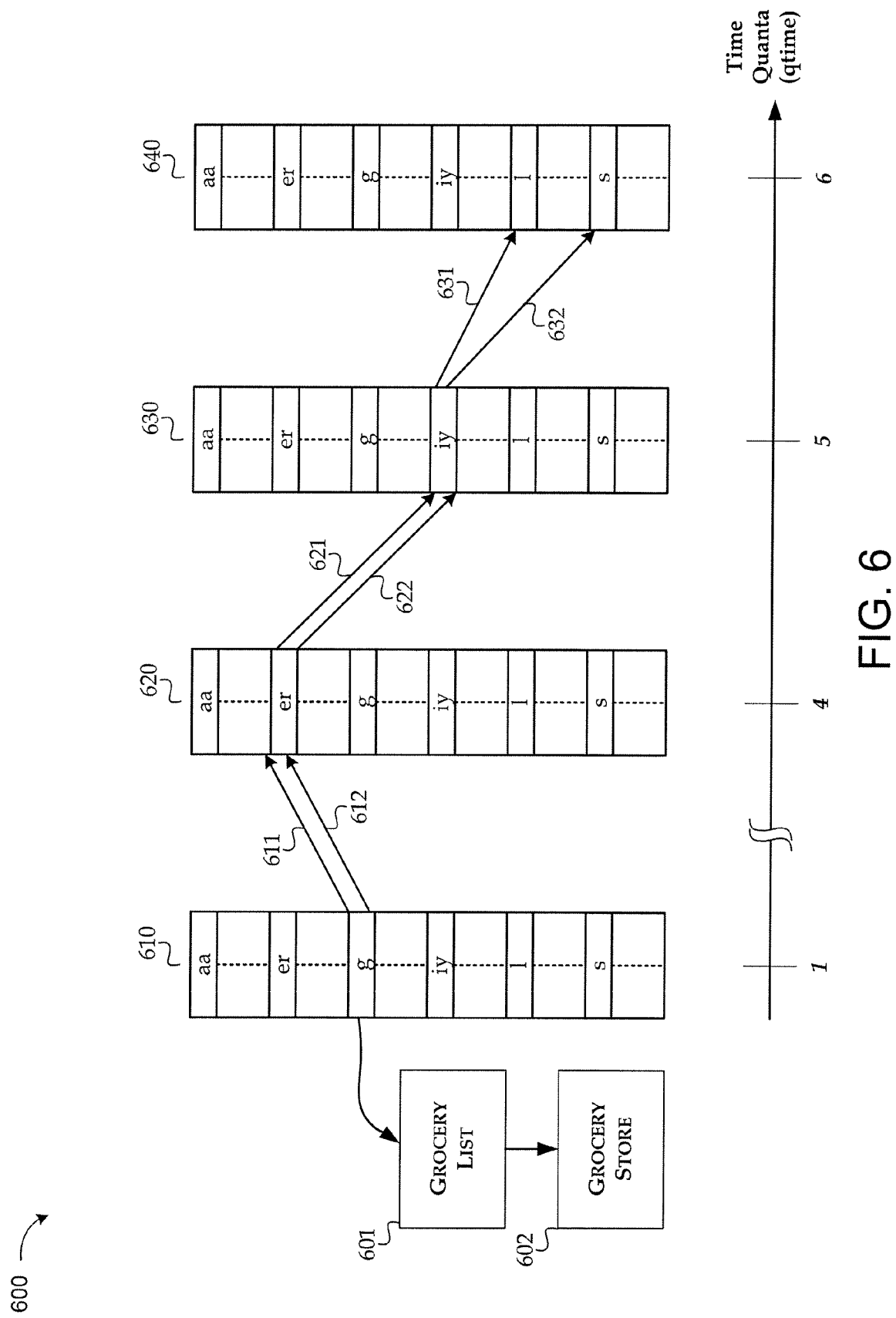

FIG. 5 and FIG. 6 are graphical diagrams illustrating the relationship between example features and pointers that link the features together in accordance with at least some aspects of the present disclosure.

FIG. 5 is a graphical illustration (500) an example feature index stream that is formed from time domain data for an audio signal. In this example, the time data corresponds to the word "speech" as may formed from an analog audio signal. The time domain data is captured and results in a feature index stream that maps to the following phonetics: "s", "p", "iy" and "ch."

The first phonetic is mapped (510) to a first feature index (e.g., 32). The second phonetic is mapped (520) to a second feature index (e.g., 30). The third phonetic is mapped (530) to a third feature index (e.g., 21). The fourth phonetic is mapped (540) to a fourth feature index (e.g., 9).

In the time domain, a sequence is formed from the first feature index to the second feature index (511), from the second feature index to the third feature index (521), and from the third feature index to the fourth feature index (531). The sequences are linked together in a reverse order to form a feature trail using previous pointers. For example, the fourth feature index is linked to the third feature index by the first previous pointer (532), the third feature index is linked to the second feature index by the second previous pointer (522), and the second feature index is linked to the first feature index by the third previous pointer (512).

In the above described example, a mapping is created from the time domain signal into a set of features that are linked together to form a "trail". In general terms a set of signal observations, comprising the utterance, U, are mapped into a sequence of feature vectors, F, based on the signal, into a sequence of QFIT entries, or "trail", T. Expressed in set terms:

$$U \xrightarrow{signaltofeatures} F \xrightarrow{featurestoQFIT} T$$

The cardinality of U is determined by the product of the sampling rate (e.g. 16 KHz) and the length of the signal. For example, a 5 second signal may give rise to 80,000 samples. The cardinality of F is lower as a result of the segmentation of the samples into time windows as previously described. For example, SGDS feature vectors may comprise 12 coefficients that are computed on 20 ms time windows, giving rise to 12×1000/20*5=4000 coefficients. The QFIT trail, T, may have even fewer entries, as the defined QFIT quantum may span 400 ms (i.e. 20 feature vectors), giving rise to 38 entries (e.g., [3 multi-res index tables]×1000/400*5=38 entries). Thus, it can be seen that QFIT trails directly lead to data compaction. It is also possible to "unravel" or decompress the QFIT representation of an utterance by following the previous pointers from the end to the start of an utterance.

FIG. 6 is another graphical illustration (600) of an example feature index stream that is formed from time domain data for another audio signal. A first time domain data stream (601) is illustrated that corresponding to the utterance "grocery list", which results in a first feature index stream that may be mapped to the phonetics: "g", "r", "ow", "s", "er", "iy", "l", "ih", "s", and "t". A second time domain data stream (602) is illustrated that corresponding to the utterance "grocery store", which results in a second feature index stream that may be mapped to the phonetics: "g", "r", "ow", "s", "er", "iy", "s", "t", "uh", "ow", and "r".

As illustrated in FIG. 6, both utterances result in a first phonetic "g" is mapped (610) to a first feature index (e.g., 17), which is followed (611, 612) by additional features such as the fourth phonetic ("er") mapped (620) to a fourth feature index (e.g., 14), which is followed (621, 622) by the fifth phonetic ("iy") mapped (630) to a fifth feature index (e.g., 21). The fifth phonetic for the first utterance ("grocery list") is followed (631) by one sixth phonetic ("l"), while the fifth phonetic for the second utterance ("grocery store") is followed (632) by another sixth phonetic (s") that is different from the other. In short, there are some common features that are clustered together for each of the utterances, while other features are different. These clusters are useful in indexing, where search terms are not necessarily exact.

Multi-resolution QFIT index tables are created by the common clusters described above. At update time parallel feature trails are created for portions of each utterance. During a query lookup, a "query utterance" can be used to locate the closest match among previously indexed utterances, where it may be expensive in terms of processing time to execute a lookup using traditional n-table joins. However, in the presently disclosure methods the lengthy time required to execute a traditional lookup can be shortened by using a histogram summation process.

Histogram Summations

In a histogram summation process, histogram bins can be designated for each known utterance identifier. Each histogram bin contains a sum that corresponds to the number of times each of those specific utterances occurred along the trail being traced out by the "query utterance". This summation process provides a measure for how similar the current query trail is when compared to existing trails for known utterances in the database, and also a time quanta for where utterances either matched or diverged from one another.

The following pseudo-code further describes an illustrative process for a histogram query lookup:

```
Result_Histogram Lookup_QFIT (Query_vector vector)
{
    for (resolution = 0; resolution < QFIT_resolutions; resolution ++)
    {
        Index index = Compute_QFIT_Index_For_Resolution_r(vector, resolution);
        Forall (UtteranceIds in cell with index)
            Result_Histogram[UtteranceId] += Weight(resolution);
    }
    return Result_Histogram;
}
```

Figure 7:
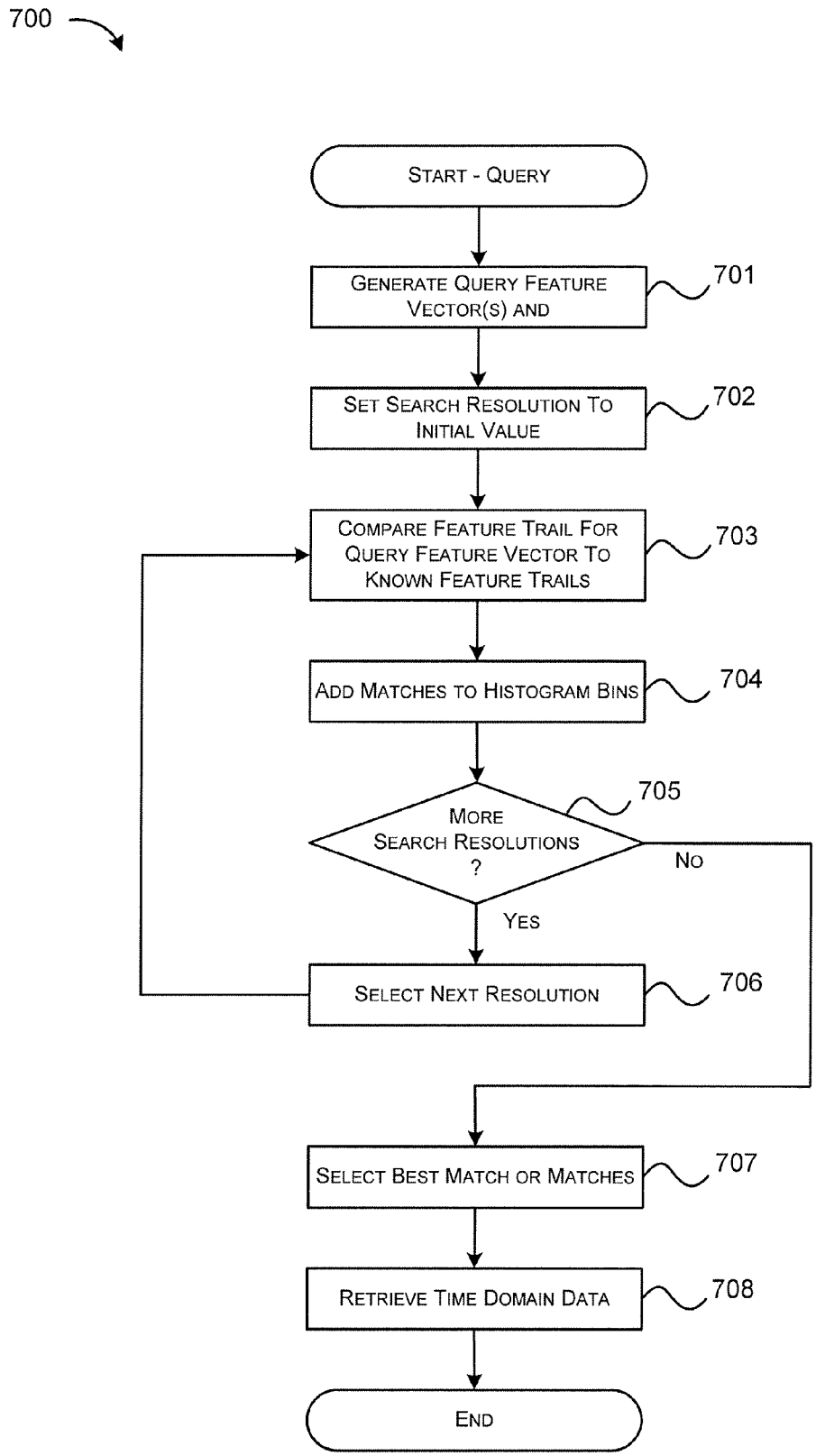
FIG. 7 is a flow diagram illustrating the operational flow for querying and locating time domain data in accordance with at least some features of the present disclosure.

FIG. 7 is a flow diagram illustrating the operational flow (700) for querying and locating time domain data in accordance with at least some features of the present disclosure. Processing begins at block 701, where one or more feature vectors are generated for the query (e.g., for a query utterance). At block 702, the search resolution for the query is set to an initial value such as fine or coarse resolution.

A processing loop for processing each feature trail at each resolution level is illustrated by blocks 703-706. At block 706, the feature trail for the query feature vector (or vectors) are compared to known feature vector trails (e.g., from previously known utterances). At block 704, matches in the feature trail are added to the appropriate histogram bins. When additional search resolutions are to be processed, processing flows from decision block 705 to block 706 where the next resolution level is selected, and returning to block 703. Otherwise, processing continues to block 707.

At block 707 the histogram bins are evaluated to determine the best match or matches. As previously described the histogram bins with the highest number of matches are likely candidates for a match. When a chain or sequence of matches are found together in a feature trail, the likelihood of an accurate match also increases. At block 708, the time domain data for the best match can be retrieved.

Garbage Collection and Cleanup

Once enough data has been entered in the QFIT tables, it is a simple process to search through the tables to discover cells where an unreasonably large number of utterances are observed (e.g. greater than some percentage of all utterances seen). These cells likely result from features being computed from ambient noise (e.g., background noise in an audio system), or perhaps excessively repeated elements in a data pattern (e.g., an utterance in a speech pattern such as "errr . . ."). Such cells typically will not add much value in searching and retrieving query results, and it is possible to truncate these features from the feature trail without losing any significant information.

In one garbage collection or cleanup scheme, cells are identified that have more than some threshold percentage of utterances associated with them. In another garbage collection scheme, a percentage of the maximum identified utterance are pruned from the feature trails. In still another garbage collection scheme, the entropy of the entire feature index database is evaluated and "garbage cells" that are identified are pruned until till some metric is met.

Figure 8:
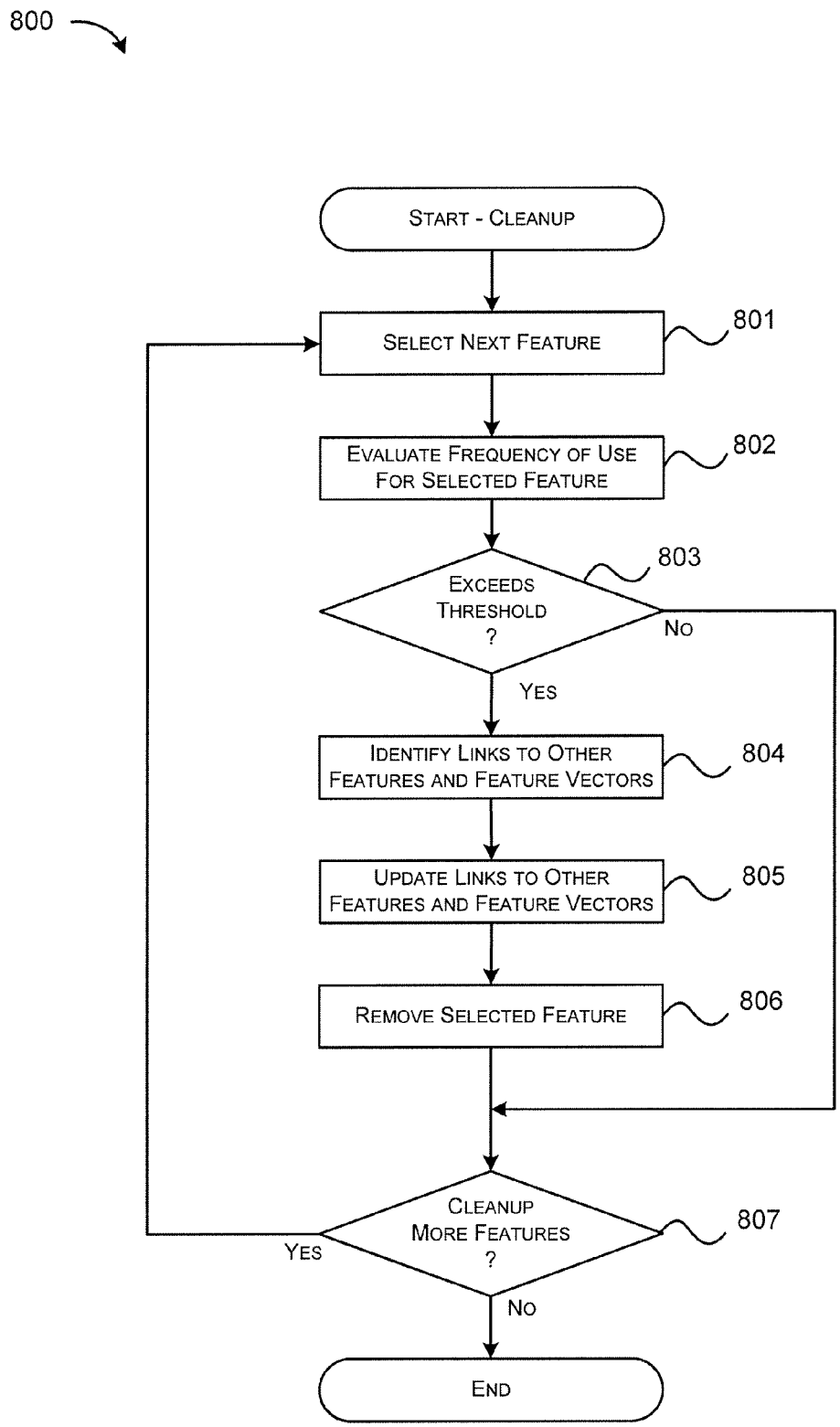
FIG. 8 is a flow diagram illustrating the operational flow for compression and cleanup in accordance with at least some aspects of the present disclosure.

FIG. 8 is a flow diagram illustrating an operational flow (800) for compression and cleanup in accordance with at least some aspects of the present disclosure. Processing begins at block 801, where the next available feature in the database is selected. At block 802, the frequency of use for the selected feature is evaluated. Processing continues to decision block 803 to determine if the frequency of use exceeds a threshold. Processing flows from decision block 803 to block 804 when the threshold is exceeded, otherwise processing continues to block decision block 807.

At block 804, a set of links are identified between the currently selected feature and other features or feature vectors. Continuing to block 805, the links to the other features and feature vectors are updated so that the selected feature can be pruned or removed at block 806. At decision block 807 the process determines if additional features are to be reviewed for cleanup. Processing returns to block 801 when additional features are to be reviewed for cleanup.

Interestingly, garbage collection in the context of QFIT gives rise to some very useful net effects. One useful garbage collection scheme is to perform auto-adaptive VAD as a post-feature computation. Another useful garbage collection scheme is to automatically detect repeatedly used speech patterns, and to compact the indexing to save update and lookup time for future processing.

QFIT's garbage collection schemes also offer a simple way of performing fundamentally related and useful operations. TfIdf or term frequency inverse document frequency is one methodology that can be used to filter out things that are highly indicative of associative context (and therefore associate the context correctly), and also to filter away the noise in the set of observations. Whereas TfIdf involves expensive log, summation and division operators, garbage collection in QFIT can be accomplished by a simple threshold and prune operation.

Example Computing Device

Figure 9:
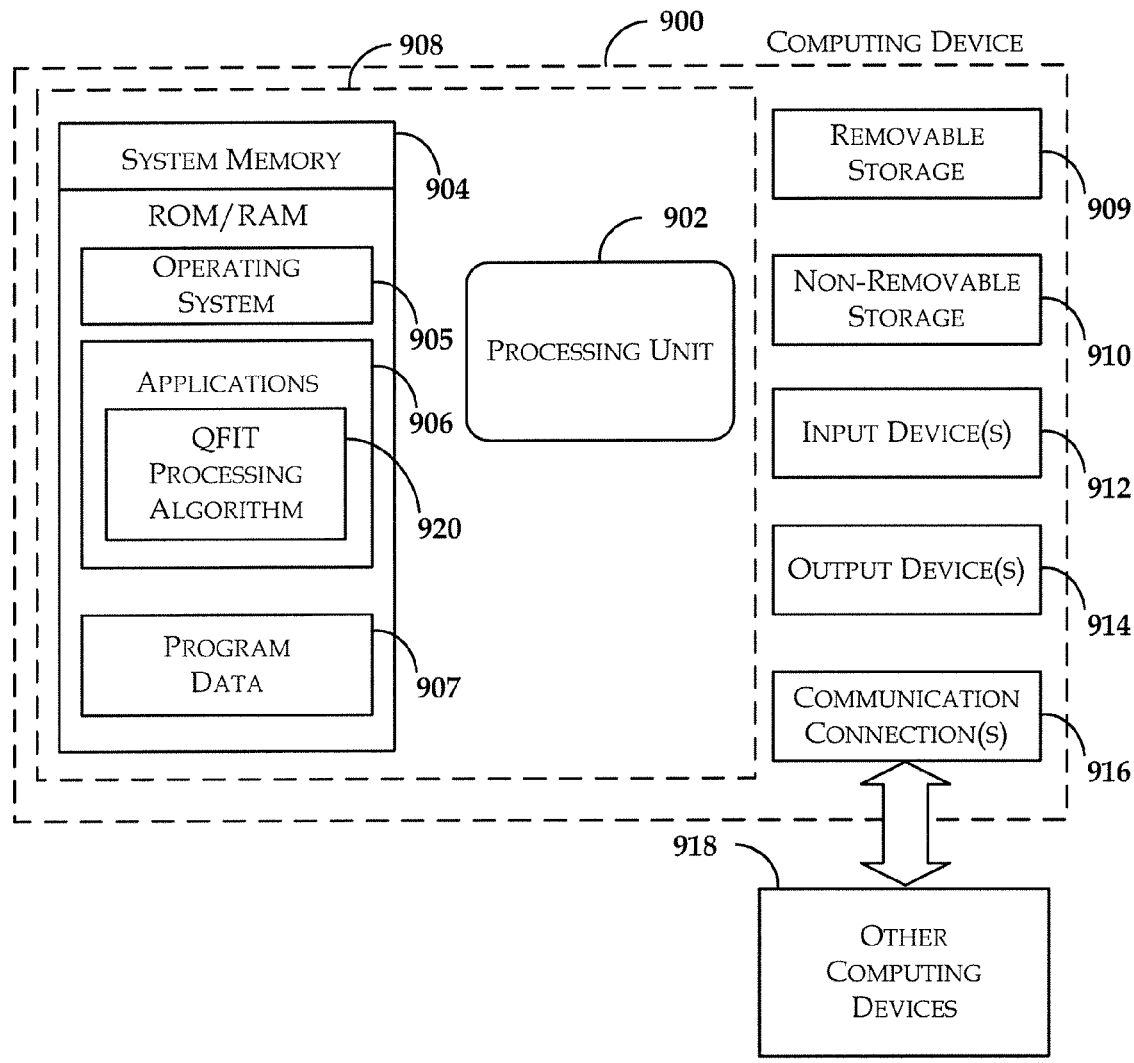
FIG. 9 is a block diagram illustrating an example computing device that is arranged in accordance with at least some features of the present disclosure.

FIG. 9 is a block diagram illustrating an example computing device (900) that is arranged in accordance with at least some features of the present disclosure. In a very basic configuration, computing device 900 typically includes at least one processing unit (902) and system memory (904). Depending on the exact configuration and type of computing device, system memory 904 may be volatile (such as RAM), non-volatile (such as ROM, flash memory, etc.) or some combination of the two. System memory 904 typically includes an operating system (905), one or more applications (906), and may include program data (907).

Application 906 includes a QFIT processing algorithm (920) that is arranged to process queries, updates and other appropriate functions for storing, retrieving, and processing process data such as time domain data, feature vectors and other related data items. In one embodiment, application 906 is arranged to process time domain signals from a user interface, extract and quantize features from the time domain signals, buffer quantized features from a feature index stream, associate time domain data with the feature index streams, and generate or search QFIT feature vector mappings for the time domain data and their associated feature index streams. This basic configuration is illustrated in FIG. 9 by those components within dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included.

Computing device 900 also contain communication connections 916 that allow the device to communicate with other computing devices 918, such as over a network. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR) and other wireless media. The term computer readable media as used herein includes both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid devices that include any of the above functions. Computing device 900 can also be implemented as a personal computer including both laptop computer and non-laptop computer configurations.

Observations and Ties to Associative Memory

The QFIT lookup procedures are very similar to associative memory (AM) and can thus be viewed as a possibly implementation for associative memory. In associative memory, terminology refers to a neural network pattern where a neuron is "fired" when a threshold for the neuron is attained. Similar to a neural network pattern, the QFIT processes identify recurring patterns that form a chain or sequence, where the identification of the recurring pattern can be viewed as analogous to the firing of the neurons in a neural network when the most similar trails in the database are found.

In one example neural network, a cortex can be modeled as 109 neurons where each neuron has up to 104 synapses. Changes in synaptic connection between neurons underlie the basis of learning, memory and some aspects of brain development. The cellular correlate of learning is thus sometimes referred to as memory-receptive field plasticity.

A fundamental premise of associative memory is that when an axon in cell A is near enough to excite cell B and repeatedly and persistently takes part in firing it, some growth process or metabolic change takes place in one or both cells such that A's efficacy in firing B is increased. The basic definition of (computational) associative memory is one which associates vectors $x^i$ with vectors $y^i$, where i denotes the pattern number. Computational associative memories need to be auto-associative, i.e. the same vector sequence must trigger itself, as well as hetero-associative, i.e. a vector should cause "similar" vectors to be recalled.

The basic characterizations of associative memories fit the QFIT abstraction such that QFIT can be considered a form of associative memory. Likeness patterns can be reinforced in the database during the update process, i.e. when we receive a fresh sequence of features and start the process of inducing a QFIT trail for it, we can simultaneously identify the closest matching features, and strengthen their weighting factors, and correlate them. Therefore, plasticity can be added to the QFIT representation to model learning, neural pathways and synaptic metabolism.

Some theorists believe that early language development in a child begins when sounds are stored in memory without the child understanding the groupings, contexts and meanings. As similar words are heard, in both the same as well as related contexts, the child's brain begins to learn about the semantic level groupings, and ultimately begins to infer meaning to the sounds. This theory is also quite good at explaining why adults, when learning a new language, usually speak it with an accent—because in that case the underlying (i.e. feature level) representation is often held static, and only the higher level mappings and labels are changed. All of this is very similar to how QFIT maintains feature trails corresponding to utterances, and only when more utterances are encountered, which follow similar trails, can higher level processes start to self-organize into groups, classes, and ultimately, infer labels and semantics. Thus, QFIT could be used as a computational model to complement, and assess the validity of psychological and neural theories of early development, especially pertaining to language acquisition.

Although many of the above discussions are focused on speech indexing and retrieval (and learning associations), QFIT processes can be defined as an abstraction layer to represent any pattern of time domain data or any stream of feature indexes irrespective of the source of the indexes (e.g., video, audio, picture data, etc.). For example, QFIT can be used to represent visual features for image recognition.

Currently speech recognition and computer vision don't couple well with higher level processing, databases, query/retrieval or archiving and indexing applications, simply because no thought has been given to creating an intermediate layer which would be capable of representing time-varying features in a way that higher level processes could process in a domain-independent way, using standard and optimized algorithms. Consequently, it becomes necessary in conventional systems to make the higher processing layers un-necessarily aware of the baseline feature set and processing algorithms, which are vastly different between these domains (e.g. speech recognition vs. motion computing algorithms such as optical flow). Each time the base level features change, or does their representation, we need to re-index databases, and change all the algorithms. It also becomes nearly impossible to engineer large scale systems that combine speech processing and video processing as it leads to doubling/trebling of size of such a system, because each module is isolated from all the others. It also becomes difficult to optimize higher level algorithms or reuse standard ones (such as quick sort), because of the close coupling.

QFIT can be used as a general purpose artificial intelligence (AI) representation that forms an abstraction layer between the baseline features and the higher level processes. Information emanating from base-level features (e.g. speech, vision, etc.) is aggregated together and stored in an index space that can later be queried and manipulated (e.g. re-organized, clustered, pruned/merged, sorted, transformed, etc.) by higher level processing modules that use general purpose algorithms. In effect, QFIT is an abstract data type that "hides" the exact form of the raw features, and enables the higher level modules to manipulate and mine them for information. A highly optimized set of operations can be used to manipulate the information, where the operations can be fine tuned independent from the base feature set. The QFIT abstraction acts as the glue between low level processing of raw feature spaces such as acoustic vectors or pixels and higher level processing such as database processing or learning theory routines such as self organizing maps. The abstraction layer that is provided by QFIT permits the base feature set and the associated algorithms to be easily replaced, while leaving the higher level processing intact.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A portable electronic device that device that is arranged to manage time domain data with a quantized feature index trajectory methodology, the portable electronic device comprising:
    a feature quantizer block that is arranged to convert the time domain data into a stream of feature indexes;
    a buffer block that is arranged to store the time domain data and also store at least a portion of the stream of feature indexes as buffered feature indexes, wherein the buffered feature indexes are associated with the time domain data;
    a QFIT processing block that is arranged to process the buffered feature indexes and the time domain data by:
        associating each buffered feature index with a respective time index relative to the corresponding time domain data;
        linking each buffered feature index together in a feature trail such that each buffered feature index in the feature trail is linked to a preceding buffered feature index that has an earlier time index; and
        generating a feature vector that is associated with the time domain data and the feature trail; and
        updating indexes for searching and retrieval operations such that the feature vector operates as an index for the time domain data.

2. The portable electronic device of claim 1, wherein each feature index is either a numerical index or a symbolic name that is mapped to a characteristic feature of the time domain data.

3. The portable electronic device of claim 1, wherein each feature index is a numerical index that is mapped to one member of a group of acoustic phonemes that represent human speech.

4. The portable electronic device of claim 1, further comprising a front end processor that is arranged to capture one or more time domain signals and generate a frame of time domain data for the feature quantizer.

5. The portable electronic device of claim 1, the feature quantizer block comprising a feature extractor block and a feature indexer block, wherein the feature extractor block is arranged to generate frequency domain data in response to the time domain data, and wherein the feature indexer block is arranged to generate the stream of feature indexes in response to the frequency domain data.

6. The portable electronic device of claim 4, the feature indexer comprising a classifier block and a feature normalization model, wherein the classifier block is arranged to compare the frequency domain data to the feature normalization model to identify an appropriate feature index for each portion of the frequency domain data.

7. The portable electronic device of claim 1, wherein the QFIT processing block is further arranged for generating a multi-resolution mapping between feature vectors and feature vectors such that different feature indexes are mapped to the feature vectors based on a specified resolution level for the QFIT processing block.

8. The portable electronic device of claim 1, wherein the QFIT processing block is further arranged to retrieve previously indexed time domain data from a feature trail for a query by: comparing the feature trail for the query to known feature trails, identifying a best match for the comparison, and retrieving the previously indexed time domain data that corresponds to the identified best match.

9. The portable electronic device of claim 1, wherein the QFIT processing block is further arranged to retrieve previously indexed time domain data from a feature trail for a query by: comparing the feature trail for the query to known feature trails at each specified resolution, identifying a best match for the comparison at each of the specified resolutions, adding matches to histogram bins for each match, and retrieving the previously indexed time domain data that corresponds to the identified best match as determined from the histogram bins.

10. The portable electronic device of claim 1, wherein the QFIT processing block is further arranged to remove a previously stored feature from an identified feature trail by: selecting the previously stored feature from the identified feature trail, evaluating a frequency of use for the selected feature, and removing the selected feature and updating the links to other features from the identified feature trail when the frequency of use for the selected feature exceeds a threshold.

11. A computer implemented method for managing time domain data with a quantized feature index trajectory methodology, the method comprising:
    segmenting a frame of time domain data into time windows;
    quantizing features for each time window segment such that each time window has a corresponding feature index;
    storing the time domain data and the quantized features;
    time stamping each quantized feature with a respective time index relative to the corresponding time domain data;
    linking each quantized feature together in a feature trail such that each quantized feature in the feature trail is linked to a preceding quantized feature that has an earlier time index;
    generating a feature vector that is associated with the time domain data and the feature trail; and
    updating indexes to the time domain data for searching and retrieval operations such that the feature vector operates as an index for the time domain data.

12. The computer implemented method of claim 11, further comprising mapping the feature vector to another feature trail that is specified at a different resolution from the feature trail such that the feature vector is mapped to different specified resolutions.

13. The computer implemented method of claim 11, further comprising retrieving previously stored time domain data using another feature trail in a retrieval query as a search index by comparing the feature trail for the retrieval query to prior known feature trails, identifying a best match for the comparison, and retrieving the previously indexed time domain data that corresponds to the identified best match.

14. The computer implemented method of claim 11, further comprising retrieving previously stored time domain data using another feature trail in a retrieval query as a search index by: comparing the feature trail for the retrieval query to prior known feature trails at each specified resolution, identifying a match for each feature in the feature trail that matches the comparison at each of the specified resolutions, adding matches to histogram bins for each matched feature in the feature trail, and retrieving the previously stored time domain data that corresponds to the identified best match as determined from the histogram bins.

15. The computer implemented method of claim 11, further comprising removing a previously stored feature from an identified feature trail by: selecting the previously stored feature from the identified feature trail, evaluating a frequency of use for the selected feature, and removing the selected feature and updating the links to other features in the identified feature trail when the frequency of use for the selected feature exceeds a threshold.

16. A computer-readable storage device for storing a set of computer-executable instructions to implement a method for managing time domain data with a quantized feature index trajectory methodology, the method comprising:
    identifying a first set of quantized features that are linked together in a first feature trail such that each quantized feature in the first feature trail is linked to a preceding one of the quantized features in the first feature trail that has an earlier time index;
    mapping the first set of quantized features in the first feature trail to a feature vector that is associated with stored time domain data;
    identifying a second set of quantized features that are linked together in the second feature trail such that each quantized feature in the second feature trail is linked to a preceding one of the quantized features in the second feature trail that has an earlier time index;
    comparing the first set of quantized features from the first feature trail to the second set of quantized features from the second feature trail;
    identifying the stored time domain data when a match is identified from the comparison of the first set of quantized features from the first feature trail to the second set of quantized features from the second feature trail; and
    performing an operation on the stored time domain data when the match is identified.

17. The computer-readable storage device for storing the set of computer-executable instructions to implement the method of claim 16, wherein performing the operation on the stored time domain data comprises one of: a retrieval operation, a storage operation, and a delete operation.

18. The computer-readable storage device for storing the set of computer-executable instructions to implement the method of claim 16, wherein performing the operation on the stored time domain data when the match is identified comprises performing a storage operation for the second set of quantized features that are linked together in the second feature trail by mapping the feature vector to the second set of quantized features with a specified resolution that is different from the first set of quantized features such that the feature vector has a multi-resolution mapping.

19. The computer-readable storage device for storing the set of computer-executable instructions to implement the method of claim 16, wherein performing the operation comprises performing a compaction operation on an identified feature trail by: selecting each previously stored feature from the identified feature trail, evaluating a frequency of use for the selected feature, removing the selected feature when the frequency of use for the selected feature exceeds a threshold, and updating the links to other features in the identified feature trail.

20. The computer-readable storage device for storing the set of computer-executable instructions to implement the method of claim 16, wherein identifying the stored time domain data when the match is identified from the comparison comprises: comparing the each quantized features for the second feature trail to each quantized feature for the first feature trail at each specified resolution, identifying a match for each quantized feature in the first feature trail that matches the comparison at each of the specified resolutions, adding matches to histogram bins for each matched feature in the first feature trail, and identifying a match from the histogram bins.

* * * * *